Dec. 2, 1969 R. J. MANN 3,482,134

ELECTRICAL PULSE BOOTSTRAP CIRCUIT

Filed Feb. 15, 1967

R. J. MANN
Inventor
Delbert O. Warner
By
Attorney

United States Patent Office 3,482,134

Patented Dec. 2, 1969

3,482,134

ELECTRICAL PULSE BOOTSTRAP CIRCUIT

Robert John Mann, Sidcup, England, assignor to International Standard Electric Corporation, New York, N.Y., a corporation of Delaware Filed Feb. 15, 1967, Ser. No. 616,290
Claims priority, application Great Britain, Feb. 24, 1966, 8,164
Int. Cl. H03k *17/60*
U.S. Cl. 307—237 3 Claims

ABSTRACT OF THE DISCLOSURE

A transistorized "bootstrap" circuit for providing a pulse. Input terminals are coupled through a transformer to the base-emitter circuit of a first transistor and the output is coupled through the collector circuit of the transistor. Improvement is made by connecting a second transistor, of opposite conductivity type, with its emitter connected to the first transistor's base and its collector to the first transistor's emitter. The base is connected to a clamp voltage for the base of the first transistor. The second transistor functions as a clamp and as a short circuit for excess drive current for the first transistor to improve the accuracy of the output pulses.

This invention relates to an electrical pulse circuit of the so-called bootstrap type, for the production of a pulse of accurately defined characteristics.

According to the invention there is provided an electrical pulse switching circuit, which includes a first transistor in the collector circuit of which is connected the load to be driven, a resistive impedance in the emitter circuit of the transistor, the value of said impedance determining the current which flows in said transistor and hence in the load when said transistor is turned on, a transformer whose primary winding is fed with an input pulse when the load is to receive current and whose secondary winding is connected between the base and emitter of said transistor, said transformer being such that an input pulse on said primary winding causes a pulse to reach said transistor's base with a suitable polarity to render said transistor conductive, a second transistor of opposite conductivity type to said first transistor with its emitter connected to the base of said first transistor and its collector connected to the emitter of said first transistor, and a connection from the base of said second transistor to which a voltage source of a value suitable to limit the increase in voltage of said first transistor's base in response to the input pulse, wherein said second transistor, in addition to acting as a clamp also provides a short-circuit path for excess current in the secondary of said transformer.

Figure 1:
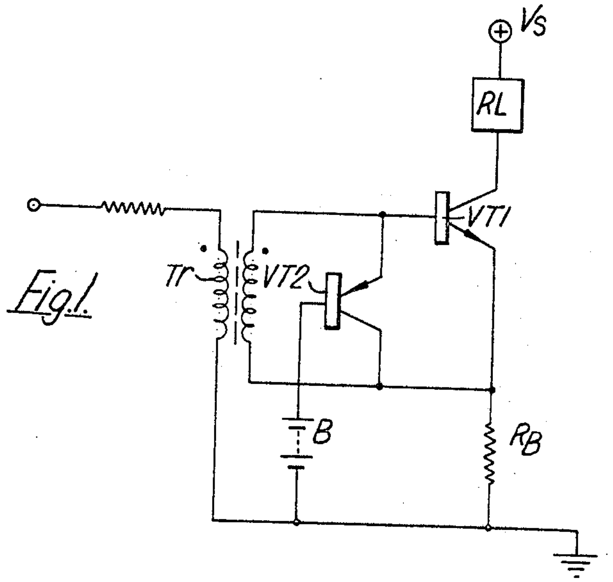
Figure 2:
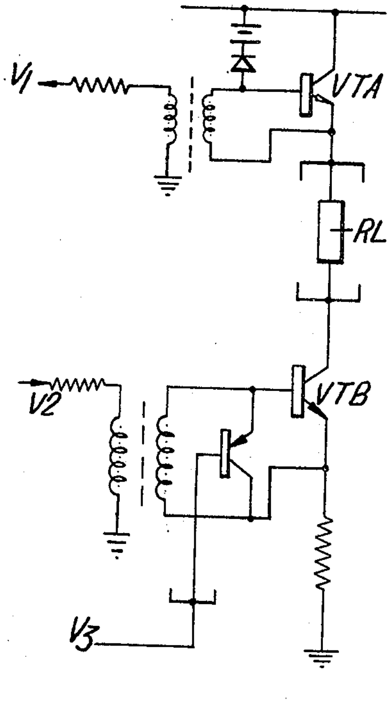
Figure 3:
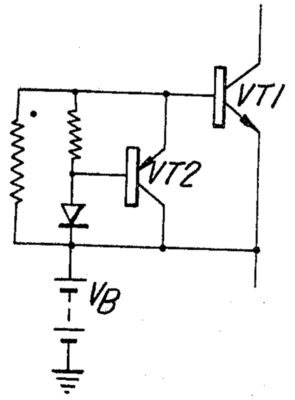

An embodiment of the invention will be described with reference to the accompanying drawings, in which FIG. 1 shows the basic principle of the invention, FIG. 2 is a more complex circuit using the arrangement of FIG. 1, and FIG. 3 shows a modification of FIG. 1.

The main portions of the circuit shown in the accompanying drawing are an amplifier transistor VT1 in the common emitter configuration, an input transformer T*r*, a clamp transistor VT2, this being of the opposite conductivity type to VT1, and the load $R_L$. In the arrangement shown VT1 is a silicon transistor while VT2 can be silicon or a germanium transistor.

In the normal condition both transistors are cut off, so that no current flows in the load. When a current pulse whose amplitude is defined by its voltage $V_1$ is applied to the input of the primary of transformer T*r*, this pulse appears there as a positive going pulse. In the circuit shown the transformer does not phase-invert, but it could do so if a negative-going pulse source was more convenient than a positive-going one. Thus a current pulse is applied from the secondary of T*r* to the base of VT1. It will be appreciated that since VT1 is fed via a transformer, VT1 cannot be permanently switched on by an input signal.

The transistor VT2, referred to above, serves two purposes; firstly its emitter-base junction functions as a clamping diode to limit the voltage on the base of VT1 to the voltage of the battery B, and secondly it acts as short circuit for any current in excess of that needed to drive the base of VT1. This will be further explained below.

In the quiescent condition it will be seen that the emitter-base junction of VT1 is shorted by the secondary of T*r*, which is then in a low impedance state. Hence VT1 is cut off. When a pulse is applied to the primary of T*r*, the current induced thereby into the secondary of T*r* turns VT1 on, so that the emitter and base voltages climb together until the emitter-base junction of VT2 catches the base of VT1 at the battery voltage. Since it is only necessary to drive the base-emitter junction of VT1 to conduction to switch VT1 on, a relatively low power input signal can switch VT1 on.

During the increase in emitter and base voltages mentioned above, the current in the collector circuit of VT1 also increases, and this is, of course, the load current. When the above-mentioned catching by VT2 becomes effective, the emitter voltage of VT1, i.e. the voltage across $R_B$, stabilises at a voltage $V_B+V_{D2}-V_{D1}$, where $V_B$ is the battery and $V_{D1}$ and $V_{D2}$ are the voltages dropped by the emitter-base junctions of VT1 and VT2 when the latter's clamp action is effective. The value of the current in $R_B$ and hence the load current in this condition is in the main determined by the value of the emitter resistor $R_B$ of VT1 and voltage $V_B$. It is not significantly affected by the $\bar{\beta}$ values (i.e. the current amplification factors) of VT1 and VT2, provided that these values exceed 10.

The transistor VT1 is current driven at its base, the current for this driving coming from the secondary of the transformer T*r*. This must provide sufficient current to the base of VT1 to keep the latter switched on and supplying the required collector current even when component parameters (including transistor parameters) and signal parameters move to their tolerance limits and the pulse is near its end. In the latter condition the amplitude of the pulse tends to drop due to the inductance effects of the transformer. Consequently, if some or all of these factors are more favourable, there is a considerable excess of current from the secondary of T*r* over that needed to drive VT1's base. This excess is short-circuited through the second transistor VT2.

With VT2 connected as shown, its emitter-collector path short-circuits any of the transformer secondary current which is in excess of that needed to drive VT1. Hence this excess current is unable to appear in VT1's collector circuit. The use of VT2 means that the effect of the transformer excess current on the collector current is greatly reduced and may even be eliminated for all practical purposes. In addition the effect of the current amplification factor on the current flowing in the collector load of VT1 is substantially reduced by the employment of VT2.

The second transistor VT2 can be a relatively cheap low-current one (perhaps even a germanium transistor), provided that it is fast enought for the pulses being handled, provided that its collector-emitter voltage drop when saturated is less than the base-emitter voltage drop of VT1, and provided that its reverse base-emitter voltage exceeds the voltage of the battery B. Another advantage of the circuit described here is that the current drain into the battery B (which would in fact usually not be a battery, but a portion of the main D.C. supplies) is greatly reduced, which would simplify the latter and reduce its dissipation. This feature is of most significance where several circuits such as shown must work with a common base source for VT2.

Since the two transistors are of opposite conductivity type their emitter-base voltage drops vary in opposite senses and as the variations are of generally similar size, the voltage difference between the base of VT2 and the emitter of VT1 is largely independent of temperature.

If the battery $V_B$ is replaced by a pulst source an AND function can be obtained.

FIG. 2 shows part of a circuit for energizing one of 28 similar load circuits such as $R_L$. Each load circuit, which could be a column of magnetic storage elements of a memory matrix, is in serious with two transistors VTA and VTB, of which VTA is one of seven similar transistors each driving four loads while VTB is one of four similar transistors driving seven loads each.

The transistors such as VTA are each driven by a pulse on the input $V_1$, while the transistors such as VTB are driven by the coincidence of pulses on inputs $V_2$ and $V_3$. Hence a coincidence $V_1$–$V_2$–$V_3$ switches the pair of transistors, one from VTA and one from VTB, needed to drive the "wanted" load.

Many transistors have a 5 volt limit on the usable base-emitter voltage, which mean that a voltage $V_B$ greater than 4 volts cannot be used without risking damage to VT2. This can be overcome by including a resistor of a few thousand ohms between the base and the emitter of VT2, and by connecting a diode from the base of VT2 to $V_B$, as shown in FIG. 3. This diode has the disadvantage of degrading somewhat the accuracy of current definition and may introduce temperature effects, but these effects can easily be overcome in the design of the source of $V_B$.

It is to be understood that the foregoing description of specific examples of this invention is made by way of example only and is not to be considered as a limitation on its scope.

What is claimed is:

1. An electrical pulse switching circuit, comprising a first transistor in the collector circuit of which is connected a load to be driven, a resistive impedance in the emitter circuit of the transistor, the value of said impedance determining the current which flows in said transistor and hence in the load when said transistor is turned on, a transformer whose primary winding is fed with an input pulse when the load is to receive current and whose secondary winding is connected between the base and emitter of said transistor, said transformer being such that at input pulse on said primary winding causes a pulse to reach said transistor's base with a suitable polarity to render said transistor conductive, a second transistor of opposite conductivity type to said first transistor with its emitter connected to the base of said first transistor and its collector connected to the emitter of said first transistor, and a connection from the base of said second transistor to a voltage source of a value suitable to limit the increase in voltage of said first transistor's base in response to the input pulse, whereby said second transistor, in addition to acting as a clamp also provides a short-circuit path for excess current in the secondary of said transformer.

2. A circuit as claimed in claim 1, in which said first transistor is a npn transistor while said second transistor is a pnp transistor.

3. A circuit as claimed in claim 1, in which the voltage source connected to the base of said second transistor is a pulse source, whereby an AND function is obtained.

References Cited

UNITED STATES PATENTS

| | | | |
|---|---|---|---|
| 2,767,330 | 10/1956 | Marshall | 307—235 |
| 3,162,771 | 12/1964 | Hilsenrath et al. | 307—288 |

OTHER REFERENCES

D. E. Norton; "Turn-off Circuit," IBM Technical Disclosure Bulletin, vol. 7, no. 6, November 1967, p. 428.

DONALD D. FORRER, Primary Examiner

H. A. DIXON, Assistant Examiner

U.S. Cl. X.R.

307—235, 264